(12) United States Patent
Kishimoto

(10) Patent No.: US 7,995,428 B2
(45) Date of Patent: Aug. 9, 2011

(54) OPTICAL DISC APPARATUS AND SEEK PROCESSING METHOD

(75) Inventor: Takashi Kishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 12/294,333

(22) PCT Filed: Mar. 23, 2007

(86) PCT No.: PCT/JP2007/056000
§ 371 (c)(1),
(2), (4) Date: Sep. 24, 2008

(87) PCT Pub. No.: WO2007/114075
PCT Pub. Date: Oct. 11, 2007

(65) Prior Publication Data
US 2009/0116347 A1 May 7, 2009

(30) Foreign Application Priority Data
Mar. 30, 2006 (JP) .................................. 2006-093993

(51) Int. Cl.
*G11B 7/00* (2006.01)
(52) U.S. Cl. .................................................... 369/44.28
(58) Field of Classification Search .................. None
See application file for complete search history.

(56) References Cited

U.S. PATENT DOCUMENTS
7,800,989 B2 * 9/2010 Nishino ..................... 369/44.29

FOREIGN PATENT DOCUMENTS
| JP | 9-120634 A | 5/1997 |
| JP | 11-120587 A | 4/1999 |
| JP | 2002-117552 A | 4/2002 |
| JP | 2002-329335 A | 11/2002 |

* cited by examiner

*Primary Examiner* — Joseph Haley
(74) *Attorney, Agent, or Firm* — Hamre, Schumann, Mueller & Larson, P.C.

(57) ABSTRACT

An optical disc apparatus of the present invention includes an optical head (103) including a lens disposed at a position shifted from a traverse axis in a tangential direction, a traverse motor (104) as a second moving unit that moves the optical head (103) in a direction traversing tracks of the optical disc (101), a number-of-tracks calculating part (123) that calculates, as the number of tracks to be sought, the number of tracks that the optical head will traverse when moving from a first address to a second address of the optical disc (101), a tracking-drive-signal-at-seek generating part (112) and a traverse-drive-signal-at-seek generating part (119) as seek controlling units that move a convergent point of an optical beam from the first address to the second address, and a number-of-tracks correcting part (124) that corrects the number of tracks to be sought according to a shift amount of the lens from the traverse axis.

9 Claims, 5 Drawing Sheets

OPTICAL DISC APPARATUS AND SEEK PROCESSING METHOD

TECHNICAL FIELD

The present invention relates to an optical disc apparatus that optically records information on an optical disc or reproduces information from an optical disc using an optical beam such as a laser emitted from a light source. The present invention further relates to a seek processing method for moving a convergent point of an optical beam from a current address to a target address of an optical disc in the optical disc apparatus.

BACKGROUND ART

An example of methods for reducing errors at the time of rough seeking in conventional optical disc apparatuses is a method in which the number of tracks to be sought is calculated from a current address and a target address, and when the number of tracks to be sought is equal to or more than a predetermined number that needs a rough seek, an optical head is moved only by a distance obtained from the number of tracks to be sought and a track pitch, using a moving unit such as a traverse motor (a stepping motor) or the like. At this time, in order to reduce errors in the moving distance caused by variance in the track pitch, a correction is provided when the number of tracks to be sought is converted to the moving distance so that the convergent point of the optical beam will reach closer to the target position in the following rough seek, taking into account the difference between the number of tracks at the position that the convergent point of the optical beam reached and the number of tracks at the target position in the last rough seek (see JP2002-329335A). The rough seek means to move the convergent point of the optical beam to a target position with comparatively low precision based on the number of tracks to be sought calculated from the current address and the target address.

In the above-mentioned conventional optical disc apparatuses, however, in the case where an optical head with another lens disposed at a position shifted from a traverse axis in a tangential direction (in a direction of a tangent to an optical disc) is used, like an optical head having dual lenses (an optical head with a dual-lens structure), for example, when a rough seek (a traverse movement) is performed only based on the moving distance obtained from the track pitch and the number of tracks to be sought calculated from the addresses, the actual lens position will be moved by the number of tracks that is different from the calculated number of tracks. Although the exact definition of the traverse axis is as described later, it briefly can be described with some concrete terms that the traverse axis here means a virtual axis that is parallel to a direction in which the optical head is moved by the traverse motor or the like and that passes above the center of the optical disc (corresponding to the center of the disc motor on which the optical disc is mounted). The lens here means a converging lens that converges an optical beam onto a predetermined position on the optical disc. As long as the lens provided in the optical head moves along the traverse axis (above the traverse axis), the lens will move along a radius of the optical disc. Therefore, once the current address and the target address are known, a radial distance and the number of tracks from the current address to the target address can be calculated assuming that the track pitch is fixed. However, when the course of movement of the lens is shifted from the traverse axis, the above-mentioned calculation does not hold and an error occurs with respect to the actual number of tracks. Drawbacks have been that such an error is too difficult to be corrected by a level of correction designed for absorbing a track pitch variance, and as a result, another seek is needed and a fine seek to the target address takes time, increasing the entire seek time. The fine seek means to move the convergent point of the optical beam to a target position by tracking control.

DISCLOSURE OF INVENTION

In view of the foregoing, the present invention has an object to provide an optical disc apparatus and a seek processing method that enable highly accurate seeks without increasing seek time by reducing errors in the number of tracks to be sought occurring at the time of rough seeking, even in the case where an optical head including a lens disposed at a position shifted from a traverse axis in a tangential direction is used.

The optical disc apparatus of the present invention is an optical disc apparatus that performs at least either recording or reproducing of information with respect to an optical disc by irradiating the optical disc with an optical beam. The optical disc apparatus includes an optical head that includes a lens disposed at a position shifted from a traverse axis in a tangential direction and that converges the optical beam onto the optical disc through the lens, a second moving unit that moves the optical head in a direction traversing tracks of the optical disc, a number-of-tracks calculating unit that calculates, as the number of tracks to be sought, the number of tracks that the optical head will traverse when moving from a first address to a second address of the optical disc, a seek controlling unit that moves a convergent point of the optical beam from the first address to the second address of the optical disc, and a number-of-tracks correcting unit that corrects the number of tracks to be sought according to a shift amount of the lens from the traverse axis.

In this description, the traverse axis means a virtual axis that is parallel to a direction in which the optical head is moved by the second moving unit and that passes above the center of the optical disc mounted on the optical disc apparatus. The state in which the lens is shifted from the traverse axis in a tangential direction is a state in which the center of the lens is not positioned above the traverse axis.

The seek processing method of the present invention is a seek processing method in an optical disc apparatus provided with an optical head that includes a lens disposed at a position shifted from a traverse axis in a tangential direction and that converges an optical beam onto the optical disc through the lens. The seek processing method includes the steps of calculating, as the number of tracks to be sought, the number of tracks that the optical head will traverse when moving from a first address to a second address of the optical disc, correcting the number of tracks to be sought that has been calculated in the step of calculating the number of tracks, according to the shift amount of the lens from the traverse axis, and controlling seeking so that the convergent point of the optical beam is moved from the first address to the second address using the corrected number of tracks to be sought.

The optical disc apparatus of the present invention can correct, according to the shift amount of the lens from the traverse axis, the number of tracks to be sought calculated from the addresses, and thereby can reduce errors in the number of tracks occurring at the time of rough seeking. Thus, it is possible to provide an optical disc apparatus having highly accurate seeking performance without increasing seek time. For the same reason, the seek processing method of the present invention can perform highly accurate seeks without increasing seek time.

BEST MODE FOR CARRYING OUT THE INVENTION

Hereinafter, embodiments of the present invention are described in detail with reference to the drawings. The embodiments described below are examples of the present invention and the present invention is not limited thereby.

Embodiment 1

Figure 1:
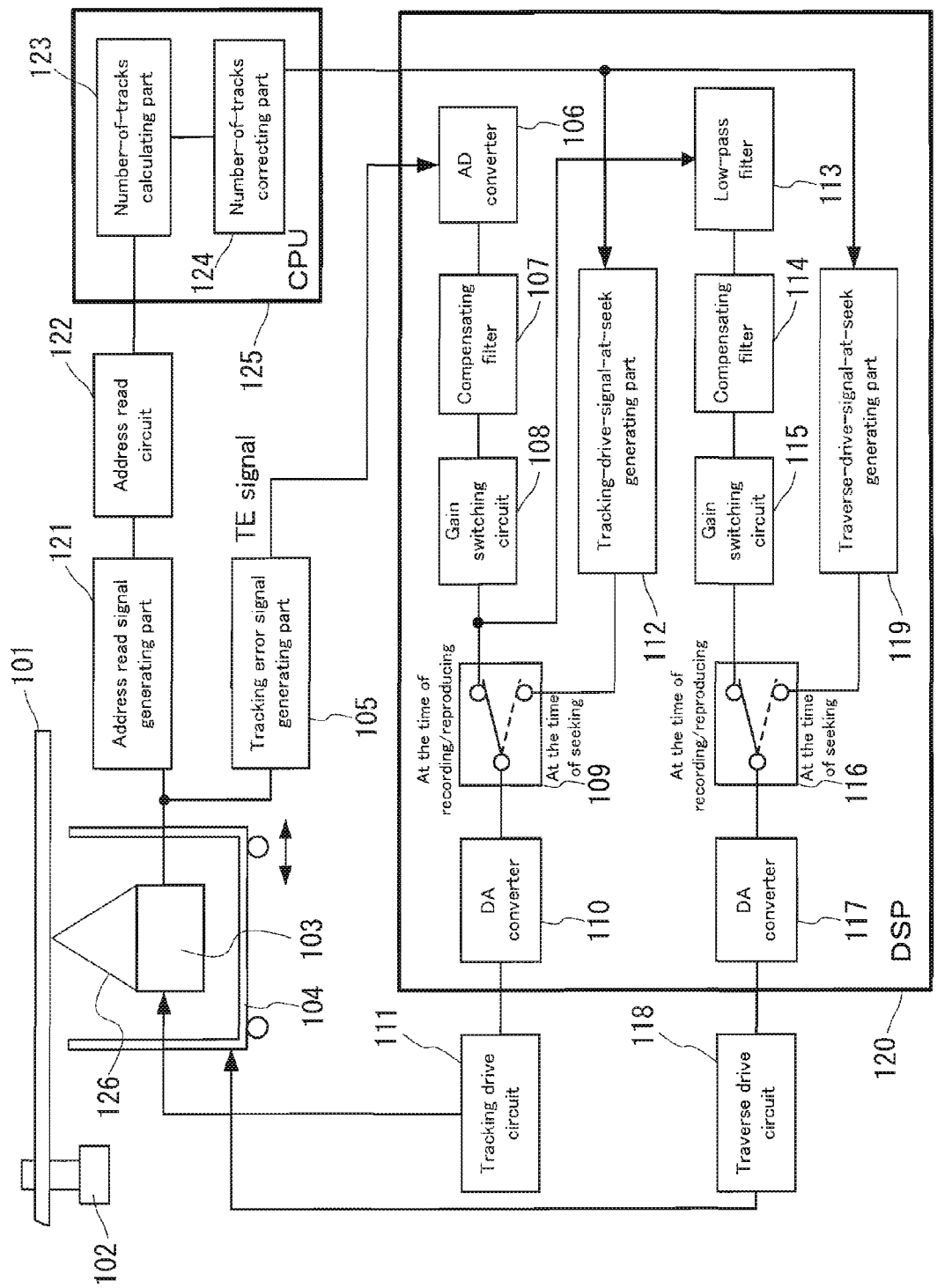
FIG. 1 is a block diagram showing a structure of an optical disc apparatus of Embodiment 1 of the present invention.

FIG. 1 is a block diagram showing a structure of an optical disc apparatus of Embodiment 1 of the present invention.

The optical disc apparatus of the present embodiment is provided with a disc motor 102 for rotating an optical disc 101 at the predetermined rate of rotations, an optical head 103 for reproducing information from the optical disc 101 or for recording information on the optical disc 101, and a traverse motor (a second moving unit) 104 for moving the entire optical head 103 in a direction perpendicular to a direction of tracks of the optical disc 101. As the traverse motor 104, a stepping motor commonly is used. The optical head 103 is composed of a light source such as a semiconductor laser, a coupling lens, a spherical aberration correcting lens, a polarization beam splitter, a polarizing plate, a converging lens, a condensing lens, a dividing mirror, a photodetector, or the like. Here, the detailed description and drawing of each component are omitted. Hereinafter, when described simply as "lens", it means a lens provided with a function that converges an optical beam onto an optical disc, that is, a converging lens.

A light beam emitted from the light source of the optical head 103 is converted to a collimated beam through the coupling lens. And after that, the spherical aberration caused by a difference in the thickness of a substrate of the optical disc 101 is corrected by the spherical aberration correcting lens. Then the optical beam is reflected by the polarization beam splitter, passes through the polarizing plate, and is converged by the converging lens to form an optical beam spot (a convergent point of the optical beam) so that a focusing point is positioned in a thickness direction of the optical disc 101. The optical disc 101 rotated by the disc motor 102 is irradiated with the optical beam spot. Reference numeral 126 in FIG. 1 shows an optical beam converged onto the optical disc 101.

Light reflected from the optical disc 101 passes through the converging lens, the polarizing plate, the polarization beam splitter, and the condensing lens, and is split into optical beams in two directions by the dividing mirror. One of the divided optical beams is input to a focusing control device (not shown) through a quadrant photodetector provided in the optical head 103, and among the output signals from each of the regions of the quadrant photodetector, the output signals from the two regions positioned diagonal to each other are added respectively. By conducting a subtraction between the two signals resulted from the additions, a positional shift signal (a focusing error (FE) signal) representing a shift between the convergent point of the optical beam and the optical disc 101 is detected, and then focusing control is performed based on the FE signal so that the convergent point is positioned on the optical disc 101. The detection of the FE signal is called an "astigmatic method". A structure and operation of the focusing control device are not related to the present embodiment directly; therefore, the description thereof is omitted.

On the other hand, the other of the optical beams split by the dividing mirror is input to a tracking control device through another quadrant photodetector provided in the optical head 103. The tracking control device is composed of a tracking error signal generating part (a track shift detecting unit) 105 and a tracking controlling part (a tracking controlling unit) that performs tracking control in response to a signal output from the tracking error signal generating part 105. The tracking controlling part is composed of a DSP (Digital Signal Processor) 120, a tracking drive circuit 111, and a tracking actuator (not shown). The tracking actuator is provided in the optical head 103 and can move the converging lens so that the convergent point of the optical beam moves in a direction traversing the tracks of the optical disc. In the present embodiment, the tracking actuator corresponds to a first moving unit.

In the tracking error signal generating part 105, among the output signals from each of the regions of the quadrant photodetector, the output signals from the regions positioned on an outer side with respect to the tracks and the output signals from the regions positioned on an inner side with respect to the tracks are added respectively. By conducting a subtraction between the two signals resulted from the additions, a track shift signal (a tracking error (TE) signal) is obtained for controlling the convergent point of the optical beam to scan over the tracks. The TE signal is input to the DSP 120. The detection of the TE signal is called a "push-pull method".

First, description is made with respect to the case where the tracking control needs to be performed, that is, the case where the optical disc apparatus is in a recording mode or a reproducing mode. The TE signal input to the DSP 120 is converted from an analog signal to a digital signal by an AD converter 106 and is input to a compensating filter 107, which is a digital filter composed of an adder, a multiplier, and a delay circuit. The compensating filter 107 compensates for a phase of a tracking control system. The TE signal with its phase compensated by the compensating filter 107 is input to a switch 109 through a gain switching circuit 108 that switches a loop gain of the tracking control system. The switch 109 opens and closes a loop of the tracking control system, and switches between a drive signal during tracking control and a drive signal during seeking with respect to the tracking actuator. Since the switch 109 is set in a position as indicated by the solid line during tracking control, the TE signal having passed through the switch 109 is converted from a digital signal to an analog signal by a DA converter 110 and is then input to the tracking drive circuit 111.

The tracking drive circuit 111 amplifies an output signal from the DSP 120 and converts its level in an appropriate manner so as to drive the tracking actuator. The tracking actuator is driven so that the convergent point of the optical beam on the optical disc 101 scans over a predetermined track. Thus, the tracking control is realized.

The TE signal having passed through the gain switching circuit 108 also is input to a low-pass filter 113 that limits a frequency band to remove noise. After passing through the low-pass filter 113, the TE signal is input to a compensating filter 114 that compensates for a phase of a transfer control system. The low-pass filter 113 and the compensating filter 114 are digital filters composed of an adder, a multiplier, and a delay circuit in the same manner as the compensating filter 107. An output from the compensating filter 114 passes through a gain switching circuit 115 that switches a gain of the transfer control system, and is input to a switch 116 that switches between a drive signal during tracking control and a drive signal during seeking with respect to the traverse motor 104. Since the switch 116 is set in a position as indicated by the solid line during tracking control, the signal having passed through the switch 116 is converted from a digital signal to an analog signal by a DA converter 117 and is input to a traverse drive circuit 118.

The traverse drive circuit 118 amplifies an output signal from the DSP 120 and converts its level in an appropriate manner so as to drive the traverse motor 104. The traverse motor 104 is driven so that the convergent point of the optical beam is aligned with the center of the converging lens, in other words, so that an optical axis of the optical beam applied and converged onto the optical disc 101 is aligned with an optical axis of the converging lens when the convergent point of the optical beam on the optical disc 101 scans over the tracks. Thus, the transfer control is realized.

Next, a seek processing in the optical disc apparatus of the present embodiment is described.

Figure 3:
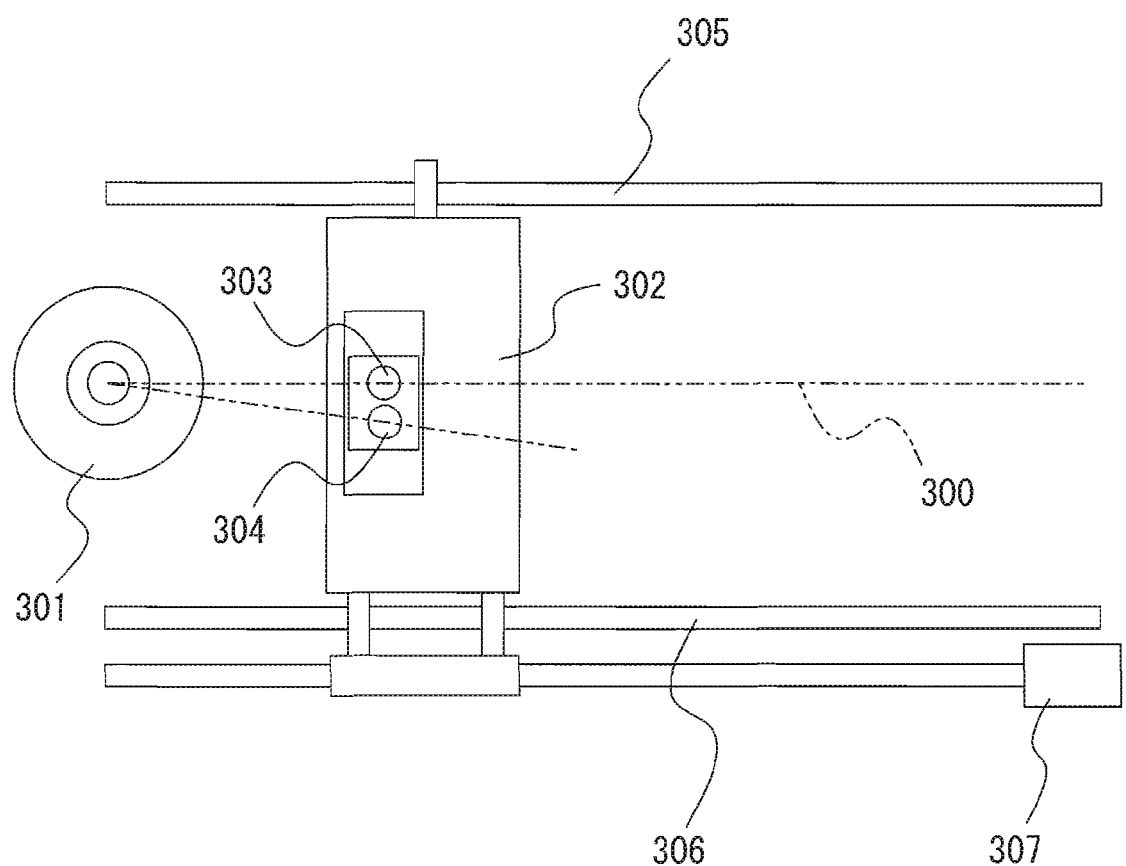
FIG. 3 is a view showing a positional relationship between a lens and a traverse axis in Embodiment 1 of the present invention.

First, the traverse axis is described. The traverse axis is a virtual axis as defined above, and is explained in more detail with reference to FIG. 3 here. FIG. 3 shows a positional relationship among a turntable 301 (a turntable to be rotated by the disc motor 102 (see FIG. 1)) on which the optical disc is to be mounted, an optical head 302 for applying an optical beam to the mounted optical disc, and a traverse motor (a second moving unit) 307 for moving the optical head 302 in a direction traversing the tracks of the optical disc. The optical head 302 is held by a traverse main shaft 306 and a traverse secondary shaft 305 so as to be moved in a direction perpendicular to a track (here, a radial direction of the optical disc) by the traverse motor 307. As shown in FIG. 3, a traverse axis 300 is a virtual axis that is parallel to a direction in which the optical head 302 is moved by the traverse motor 307 and that passes above the center of the optical disc mounted on the optical disc apparatus (here, the center of the rotation of the disc motor 102 (see FIG. 1) on which the optical disc is to be mounted (the center of the rotation of the turntable 301)). The optical head 302 shown in FIG. 3 is an optical head with a dual-lens structure having a DVD (Digital Versatile Disk)/CD (Compact Disk) lens 303 disposed at a position not shifted from the traverse axis 300 and a BD (Blu-ray Disk) lens 304 disposed at a position shifted from the traverse axis 300 in a tangential direction. Here, the shift amount specifically means a distance between the centers of the lenses, and is in a range of, for example, 2.5 mm to 5 mm. The lower limit of the shift amount is determined by the aperture of a minimum-size object lens feasible in practical use, while the upper limit is determined by the maximum-size of an actuator with which no problems are observed in practical use, respectively.

Figure 2:
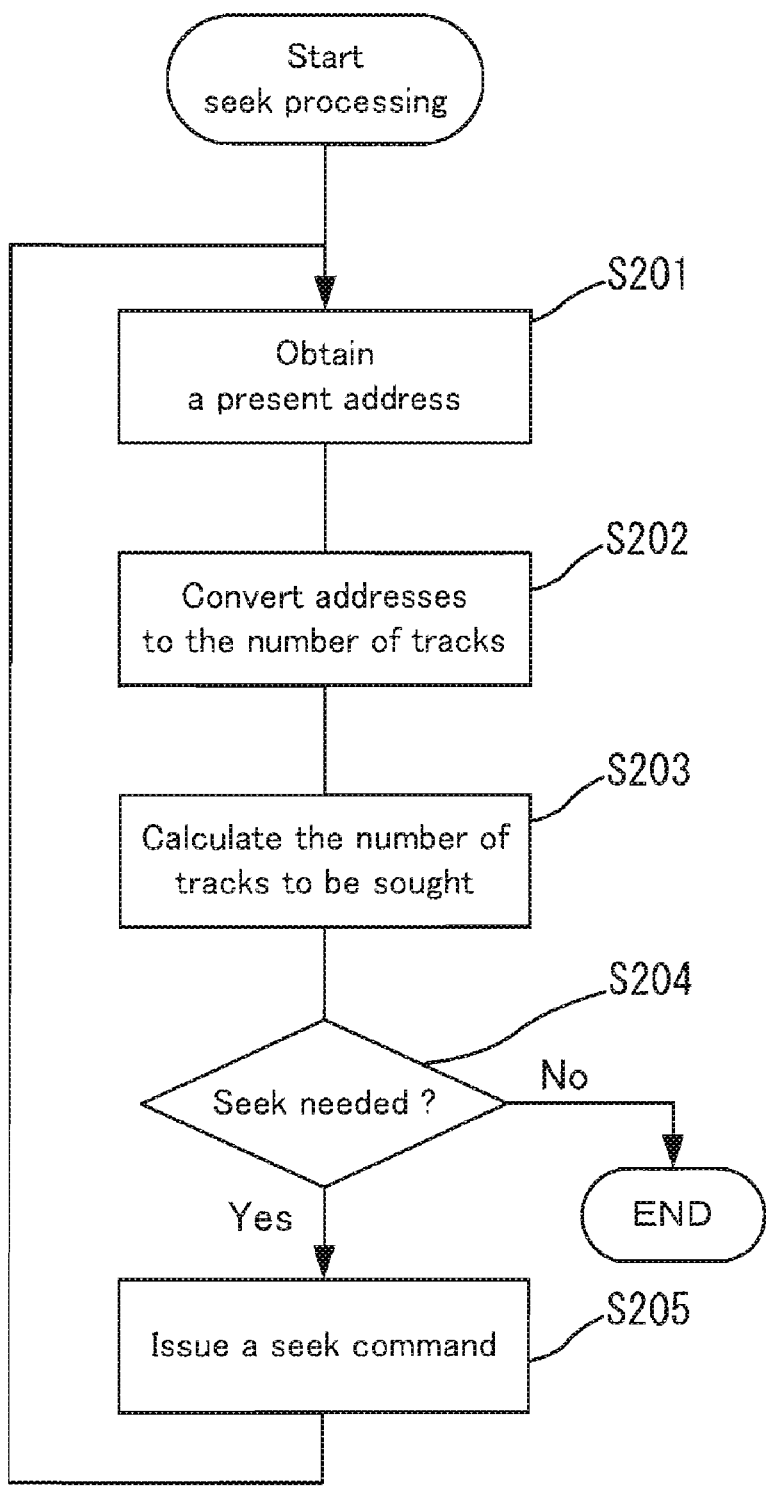
FIG. 2 is a flow chart showing a common seek processing in which an optical head with a lens not shifted from a traverse axis is used.

First, in the optical disc apparatus of the present embodiment, description is made with respect to a common seek processing in the case where a lens is used that is not shifted from the traverse axis, that is, a lens (the DVD/CD lens 303 in the example shown in FIG. 3) disposed above the traverse axis is used, with reference to the flow chart in FIG. 2 and FIG. 3 in addition to the block diagram in FIG. 1. In the present embodiment, description is made in detail with respect to the case where the optical disc mounted on the apparatus is a DVD-ROM (DVD-Read Only Memory) disc (with a track pitch of 0.74 µm), and seeking is performed from an innermost periphery to an outermost periphery of a user area thereof.

An output signal from the optical head 103 is input to an address read signal generating part 121 so that an address (a current address (a first address)) on the optical disc 101 is read in an address read circuit 122. At Step S201, a CPU 125 obtains the current address from the address read circuit 122.

Next, at Step S202, a number-of-tracks calculating part (a number-of-tracks calculating unit) 123 converts the current address and a target address (a second address) to the number of tracks from a predetermined radial position, based on a linear velocity and the track pitch of the optical disc 101. Generally, radius r=0 mm is used as the predetermined radial position. In the present embodiment, when radius r=0 mm is used as a reference, the address of the innermost periphery (r=24 mm) of the user area is converted to the number of tracks from the reference, that is, 24 [mm]/0.74 [µm]=32432 tracks. The address of the outermost periphery (r=58 mm) of the user area is converted to the number of tracks from the reference, that is, 58 [mm]/0.74 [µm]=78378 tracks.

Subsequently, at Step S203, the number of tracks that the optical head will traverse when moving from the current address to the target address is calculated as the number of tracks to be sought, based on the current number of tracks and the target number of tracks obtained at Step S202. Here, the number of tracks to be sought is 78378 [tracks]−32432 [tracks]=45946 tracks.

Further, the necessity of seeking is judged at Step S204. When it turns out to be necessary, the CPU 125 issues, at Step S205, to the DSP 120 the number of tracks to be sought and a seeking direction calculated at Step S203, as parameters for a seek command. Here, a seek command for seeking 45946 tracks in a direction toward an outer periphery is issued. The seek processing ends when seeking is judged to be unnecessary at Step S204 (specifically, when the current track is about one or two tracks before the target track).

The described here is a common seek processing in the case where the lens is not shifted from the traverse axis, so the number of tracks to be sought calculated by the number-of-tracks calculating part 123 is issued to the DSP 120 as it is (without passing through a number-of-tracks correcting part (a number-of-tracks correcting unit) 124 shown in FIG. 1).

The DSP 120 having received the seek command from the CPU 125 sets the switches 109 and 116 in positions as indicated by the dotted lines, drives the tracking actuator using a signal generated in a tracking-drive-signal-at-seek generating part 112, and drives the traverse motor 104 using a signal generated in a traverse-drive-signal-at-seek generating part 119. The tracking-drive-signal-at-seek generating part 112 generates a tracking actuator drive signal at the time of seeking. Generally, the tracking actuator is driven using an acceleration/deceleration pulse in case of track jumping for jumping to an adjacent track, and using a signal that reduces the shaking of the lens during a seek in case of traverse seek. The specific method of generating the tracking actuator drive signal at the time of seeking is not related to the present embodiment directly; therefore, the description thereof is omitted.

The traverse-drive-signal-at-seek generating part 119 generates a drive signal profile for the traverse motor 104 using the number of tracks to be sought, the seeking direction, and the track pitch of the optical disc 101. Here, a drive signal profile for moving by 45946 [tracks]×0.74 [µm]=34 mm in a direction toward the outer periphery is generated. The specific method of generating the drive signal profile is not related to the present embodiment directly; therefore, the description thereof is omitted.

After the seek command at Step S205 is completed, the sequence returns to Step S201 again to repeat the above-mentioned process until seeking is judged to be unnecessary at Step S204. Thus, the seeking for the target address is performed.

Figure 4:
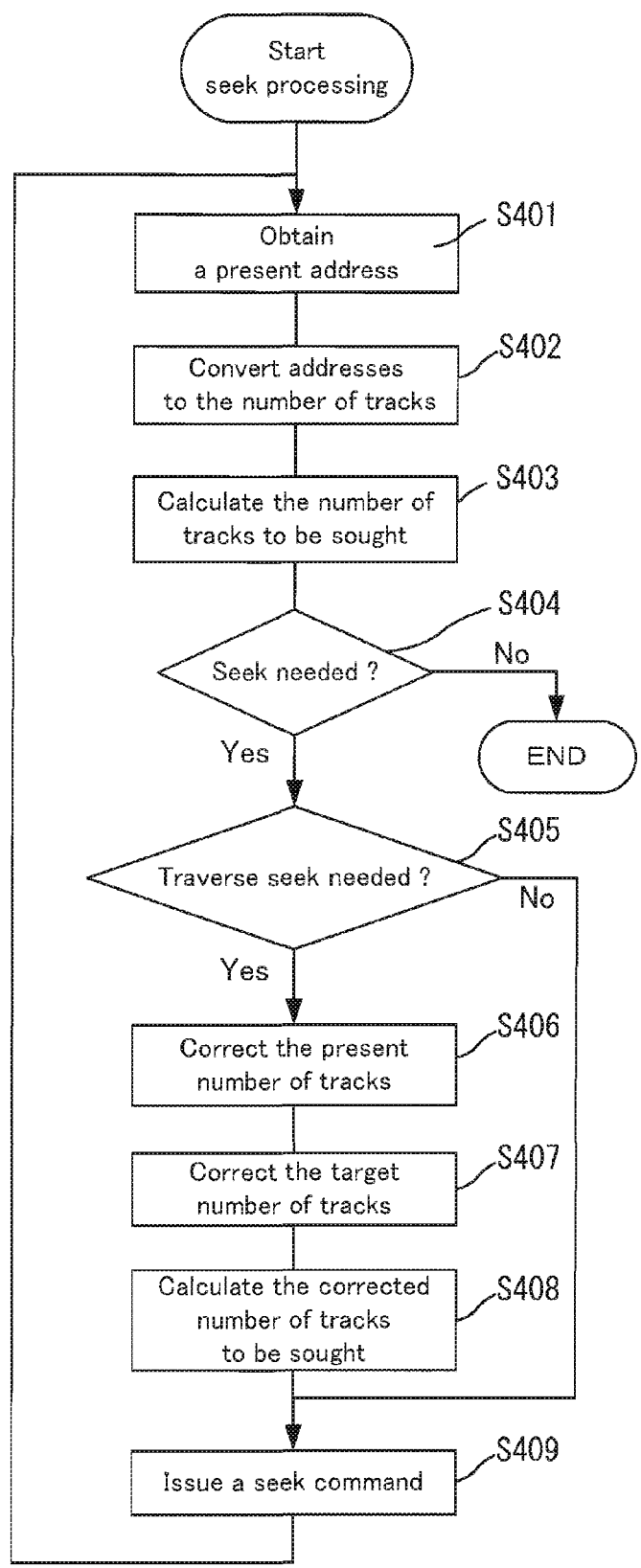
FIG. 4 is a flow chart showing a process of correcting the number of tracks to be sought in the optical disc apparatus of Embodiment 1 of the present invention.

Next, in the optical disc apparatus of the present embodiment, description is made in detail with respect to a seek processing in the case where a lens (the BD lens 304 in the example shown in FIG. 3) disposed at a position shifted from the traverse axis in a tangential direction is used, with reference to the relational diagram describing the positional relationship of the lens 304 and the traverse axis 300 shown in FIG. 3 and the flow chart in FIG. 4 in addition to the block diagram in FIG. 1.

The optical head 302 is held by the traverse main shaft 306 and the traverse secondary shaft 305 so as to be moved in a direction perpendicular to a track by the traverse motor 307. Here, the DVD/CD lens 303 is disposed above the traverse axis 300 that passes above the center of the turntable 301 and is parallel to the traverse main shaft 306 and the traverse secondary shaft 305. On the other hand, the BD lens 304 is disposed at a position shifted from the traverse axis 300 in a tangential direction. Here, description is made in detail with respect to the case where the shift amount of the BD lens 304 from the traverse axis 300 is 3 mm, the optical disc 101 mounted on the apparatus is a BD-ROM disc (with a track pitch of 0.32 μm) and seeking is performed from an innermost periphery to an outermost periphery of a user area thereof.

Output signals from the optical heads 103 and 302 are input to the address read signal generating part 121 so that an address (a current address (a first address)) on the optical disc 101 is read in the address read circuit 122. At Step S401, the CPU 125 obtains the current address from the address read circuit 122.

Next, at Step S402, the number-of-tracks calculating part (the number-of-tracks calculating unit) 123 converts the current address and a target address (a second address) to the number of tracks from a predetermined radial position, based on a linear velocity and the track pitch of the optical disc 101. At this time, the conversion to the number of tracks is performed assuming that the BD lens 304 moves above the traverse axis 300. Generally, radius r=0 mm is used as the predetermined radial position. In the present embodiment, when radius r=0 mm is used as a reference, the address of the innermost periphery (r=24 mm) of the user area is converted to the number of tracks from the reference, that is, 24 [mm]/0.32 [μm]=75000 tracks. The address of the outermost periphery (r=58 mm) of the user area is converted to the number of tracks from the reference, that is, 58 [mm]/0.32 [μm]=181250 tracks.

Subsequently, at Step S403, the number of tracks that the optical head will traverse when moving from the current address to the target address is calculated as the number of tracks to be sought, based on the current number of tracks and the target number of tracks obtained at Step S402. In case of the present embodiment, the number of tracks to be sought is 181250 [tracks]−75000 [tracks]=106250 tracks.

Further, the necessity of seeking is judged at Step S404. When it turns out to be necessary, it is judged at Step S405 whether the number of tracks to be sought is a number that needs a traverse seek. When the number of tracks to be sought is equal to or less than the number of tracks by which the traverse seek is judged to be unnecessary, a seek command is executed while the number of tracks passed is being counted using a TE signal or a signal obtained by binarizing the TE signal. In this case, it is unnecessary to correct further the number of tracks to be sought calculated at Step S403. Here, the predetermined number of tracks specifically is, for example, 1000 tracks, or 320 μm when converted to a distance, in case of a BD-ROM (BD-Read Only Memory) disc with a track pitch of 0.32 μm. Although seeking becomes highly accurate when the counting of the number of tracks passed is performed at the same time, it usually takes more time than a traverse seek. Therefore, such a predetermined number is given taking into account a balance between accuracy and access time. The seek command is executed at Step S409. A basic performance of the seek command already has been provided; therefore, the description thereof is omitted here. The seek processing ends when another seek is judged to be unnecessary at Step S404 (specifically, when an access was made with a small error so that the current track is about one or two tracks before the target track).

When the number of tracks to be sought is a number by which the traverse seek is judged to be necessary at Step S405, that is, when the number of tracks to be sought is judged to exceed the predetermined number, the number of tracks to be sought is corrected according to the shift amount of the lens from the traverse axis (3 mm in the present embodiment) at Steps S406 and S407. In the present embodiment, for example, the number-of-tracks correcting part 124 corrects the number of tracks to be sought calculated from the addresses so that the number of tracks to be sought increases according to the shift amount of the lens from the traverse axis. Hereinafter, a specific example of the correction of the number of tracks to be sought is described.

When the number of tracks to be sought is corrected in the present embodiment, the current number of tracks and the target number of tracks firstly are corrected according to the shift amount of the lens from the traverse axis. Specifically, since the BD lens 304 is shifted from the traverse axis by 3 mm, the current number of tracks, that is, 75000, is corrected as shown in the following equation.

$$\sqrt{(75000[\text{tracks}] \times 0.32[\mu m])^2 - (3[\text{mm}])^2}/0.32\ [\mu m]$$
$$\approx 74411\ [\text{tracks}] \qquad [\text{Equation 1}]$$

The target number of tracks, that is, 181250, is corrected as shown in the following equation.

$$\sqrt{(181250[\text{tracks}] \times 0.32[\mu m])^2 - (3[\text{mm}])^2}/0.32\ [\mu m]$$
$$\approx 181007\ [\text{tracks}] \qquad [\text{Equation 2}]$$

Subsequently, at Step S408, the corrected number of tracks to be sought is calculated based on the current number of tracks and the target number of tracks that have been corrected. Here, the corrected number of tracks to be sought is 181007 [tracks]−74411 [tracks]=106596 tracks.

Next, at Step S409, the CPU 125 issues to the DSP 120 the corrected number of tracks to be sought and a seeking direction calculated at Step S408, as parameters for a seek command. Here, a seek command for seeking 106596 tracks in a direction toward the outer periphery is issued.

The DSP 120, having received the seek command from the CPU 125, generates, in the traverse-drive-signal-at-seek generating part 119, a drive signal profile for the traverse motor 104 using the corrected number of tracks to be sought, the seeking direction, and the track pitch of the optical disc 101. Here, a drive signal profile for moving the traverse motor 104 by 106596 [tracks]×0.32 [μm]≈34.11 mm in a direction toward the outer periphery is generated. Thus, the optical head 103 (302) is moved by 34.11 mm. It means that the BD lens 304 actually is moved over the optical disc 101 by 34 mm in a radial direction.

After the seek command at Step S409 is completed, the sequence returns to Step S401 again to repeat the above-mentioned process until seeking is judged to be unnecessary at Step S404. Thus, the seeking for the target address is performed.

As described above, the errors in the number of tracks occurring at the time of rough seeking can be reduced by correcting, according to the shift amount of the lens from the traverse axis, the number of tracks to be sought calculated from the addresses. Here, a specific correcting method is described with respect to the case where the current address is in the innermost periphery while the target address for seeking is in the outermost periphery of the user area. However, the current address and the target address are not limited to these, and a correction can be made in the same manner even if the current address and the target address are not as in this case. For example, when the shift amount of the lens from the traverse axis is denoted as $d_1$, the number of tracks from the predetermined radial position used as a reference to the current address is denoted as $M_1$, the number of tracks from the predetermined radial position to the target address is denoted as $M_2$, and the track pitch is denoted as TP, the corrected number of tracks to be sought can be calculated using the following equation.

$$\text{Corrected number of tracks to be sought} = |\sqrt{(M_2 \times TP)^2 - d_1^2}/TP - \sqrt{(M_1 \times TP)^2 - d_1^2}/TP| \quad \text{[Equation 3]}$$

In the present embodiment, description is made with respect to the optical head in which the DVD/CD lens is disposed above the traverse axis while the BD lens is disposed at a position shifted from the traverse axis, but the arrangement has no limitation at all. However, when the DVD/CD lens and the BD lens are disposed in one optical head, control for recording and reproducing of information with respect to a DVD/CD medium already may have been established in some cases for a system in which the lens is disposed above the traverse axis. Therefore, when it is desirable to maintain the established control method, the lens may be arranged in the positional relationship as shown in FIG. 3. Moreover, the same effects can be obtained, for example, with a single-lens optical head in which the lens is disposed at a position shifted from the traverse axis and with a dual-lens optical head in which the two lenses are both disposed at positions shifted from the traverse axis.

Embodiment 2

An optical disc apparatus and a seek processing method in Embodiment 2 of the present invention are described. The optical disc apparatus of the present embodiment can be realized by further providing a lens shift amount storing part (a lens shift amount storing unit) in the CPU in the structure of Embodiment 1 shown in FIG. 1 so as to change the processing at the number-of-tracks correcting part. The same components (the components having the same function) as those in Embodiment 1 are denoted with the same reference numerals as those therein. Therefore, the description thereof is omitted here.

Figure 5:
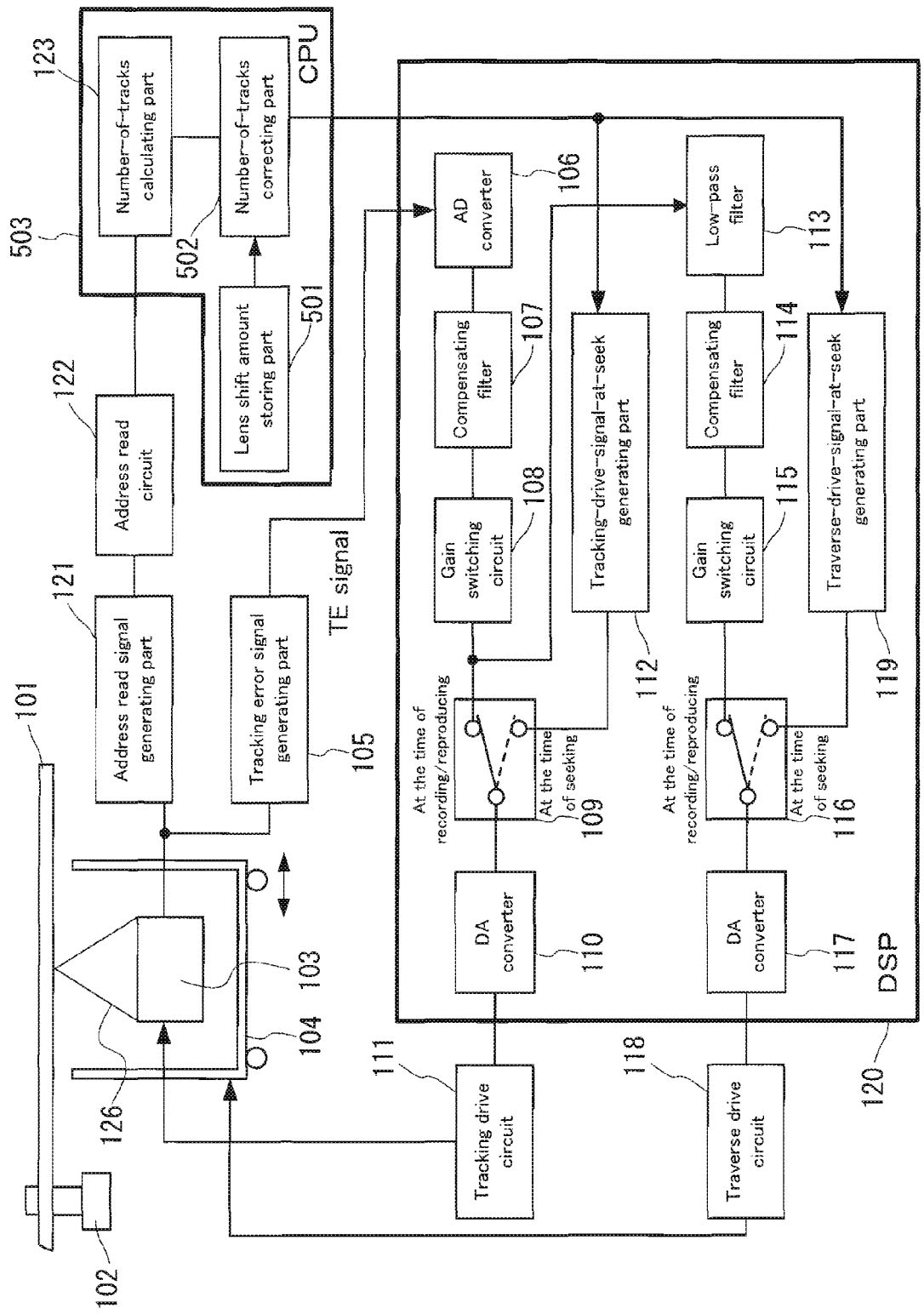
FIG. 5 is a block diagram showing a structure of an optical disc apparatus of Embodiment 2 of the present invention.

Description is made in detail with respect to the optical disc apparatus and the seek processing of the present embodiment with reference to the block diagram in FIG. 5 in addition to the relational diagram in FIG. 3 and the flow chart in FIG. 4. The seek processing in the present embodiment can be described with reference to the flow chart shown in FIG. 4 because it is the same as the seek processing of Embodiment 1 except for the specific method of calculating the corrected number of tracks to be sought. A design value is used as the shift amount of the lens from the traverse axis when a correction is made in Embodiment 1. In the present embodiment, however, the variance of shift amount caused by variance in assembly of the optical heads 103 and 302 is measured on each apparatus after assembly, and then stored in a lens shift amount storing part 501 as an actually-measured shift amount $d_2$ [mm] to be used for correction. Specifically, only the difference from Embodiment 1 is described with respect to the case where the optical disc 101 mounted on the apparatus is a BD-ROM disc (with a track pitch of 0.32 μm) and seeking is performed from an innermost periphery to an outermost periphery of a user area thereof.

When a traverse seek is needed as a result of Steps S401 to S405, a number-of-tracks correcting part 502 corrects the current number of tracks and the target number of tracks at Steps S406 and S407 respectively, using the shift amount $d_2$ [mm] stored in the lens shift amount storing part 501. Specifically, the current number of tracks, that is, 75000, is corrected as shown in the following equation.

$$\sqrt{(75000[\text{tracks}] \times 0.32[\mu m])^2 - (d_2[mm])^2}/0.32 \, [\mu m]$$
$$= N_1 \, [\text{tracks}] \quad \text{[Equation 4]}.$$

The target number of tracks, that is, 181250, is corrected as shown in the following equation.

$$\sqrt{(181250[\text{tracks}] \times 0.32[\mu m])^2 - (d_2[mm])^2}/0.32 \, [\mu m]$$
$$= N_2 \, [\text{tracks}] \quad \text{[Equation 5]}$$

Next, the corrected number of tracks to be sought is calculated at Step S408 based on the current number of tracks and the target number of tracks that have been corrected. In the present embodiment, the corrected number of tracks to be sought is $N_2$ [tracks]$-N_1$ [tracks]$=N_3$ [tracks].

Subsequently, at Step S409, a CPU 503 issues to DSP 120 the corrected number of tracks to be sought and a seeking direction calculated at Step S408, as parameters for a seek command. Here, a seek command for seeking $N_3$ tracks in a direction toward the outer periphery is issued. Since the process after this is the same as in Embodiment 1, the description thereof is omitted.

As described above, according to the optical disc apparatus and the seek processing method of the present embodiment, the errors in the number of tracks occurring at the time of rough seeking can be reduced by correcting, according to the shift amount of the lens from the traverse axis, the number of tracks to be sought calculated from the addresses. Furthermore, in the optical disc apparatus and the seek processing method of the present embodiment, a rough seek with higher accuracy can be realized because the number of tracks to be sought is corrected not using a design value of shift amount but using the shift amount that actually was measured and stored on each apparatus after assembly, taking into account the variance of shift amount caused by variance in assembly of the optical head.

In the present embodiment, description is made with respect to the optical head in which the DVD/CD lens is disposed above the traverse axis while the BD lens is disposed at a position shifted from the traverse axis, but the arrangement has no limitation at all. The same effects can be obtained, for example, with a single-lens optical head in which the lens is disposed at a position shifted from the traverse axis and with a dual-lens optical head in which the two lenses are both disposed at positions shifted from the traverse axis.

INDUSTRIAL APPLICABILITY

An optical disc apparatus and a seek processing method of the present invention can reduce errors in the number of tracks occurring at the time of rough seeking and enable highly accurate seeks without increasing seek time, by correcting, according to a shift amount of a lens from a traverse axis, the number of tracks to be sought calculated from addresses. Therefore, these are useful for a Blu-ray disc recorder or the like that is provided with a blue laser. Moreover, these are applicable not only to a recorder but also to applications such as a player and a PC drive.

The invention claimed is:

1. An optical disc apparatus that performs at least either recording or reproducing of information on or from an optical disc by irradiating the optical disc with an optical beam, the optical disc apparatus comprising:
    an optical head that includes a lens disposed at a position shifted from a traverse axis in a tangential direction and that converges the optical beam onto the optical disc through the lens;
    a second moving unit that moves the optical head in a direction traversing tracks of the optical disc;
    a number-of-tracks calculating unit that calculates, as the number of tracks to be sought, the number of tracks that the optical head will traverse when moving from a first address to a second address of the optical disc;
    a seek controlling unit that moves a convergent point of the optical beam from the first address to the second address of the optical disc; and
    a number-of-tracks correcting unit that corrects the number of tracks to be sought according to a shift amount of the lens from the traverse axis.

2. The optical disc apparatus according to claim 1, further comprising:
    a track shift detecting unit that generates a signal corresponding to a positional relationship between the convergent point of the optical beam and the tracks; and
    a tracking controlling unit that includes a first moving unit capable of moving the lens so that the convergent point of the optical beam moves in a direction traversing the tracks and that controls a position of the lens by the first moving unit so that the convergent point of the optical beam scans over the tracks in response to an output signal from the track shift detecting unit.

3. The optical disc apparatus according to claim 1, wherein the number-of-tracks correcting unit does not correct the number of tracks to be sought when the number of tracks to be sought that has been calculated by the number-of-tracks calculating unit is equal to or less than a predetermined number.

4. The optical disc apparatus according to claim 1, further comprising a lens shift amount storing unit that stores the shift amount of the lens from the traverse axis, wherein
    the number-of-tracks correcting unit corrects the number of tracks to be sought according to the shift amount stored in the lens shift amount storing unit.

5. The optical disc apparatus according to claim 1, wherein the second moving unit is a stepping motor.

6. The optical disc apparatus according to claim 1, wherein the number-of-tracks correcting unit corrects the number of tracks to be sought so that the number of tracks to be sought increases according to the shift amount of the lens from the traverse axis.

7. The optical disc apparatus according to claim 6, wherein the number-of-tracks correcting unit corrects the number of tracks to be sought using the following equation:

$$\text{Corrected number of tracks to be sought} = |\sqrt{(M_2 \times TP)^2 - d_1^2}/TP - \sqrt{(M_1 \times TP)^2 - d_1^2}/TP| \quad \text{[Equation 6]}$$

where $d_1$ denotes the shift amount of the lens from the traverse axis, $M_1$ denotes the number of tracks from a predetermined radial position to the first address of the optical disc, $M_2$ denotes the number of tracks from the predetermined radial position to the second address, and TP denotes a track pitch.

8. A seek processing method in an optical disc apparatus provided with an optical head that includes a lens disposed at a position shifted from a traverse axis in a tangential direction and that converges an optical beam onto the optical disc through the lens, the seek processing method comprising the steps of:
    calculating, as the number of tracks to be sought, the number of tracks that the optical head will traverse when moving from a first address to a second address of the optical disc;
    correcting the number of tracks to be sought that has been calculated in the step of calculating the number of tracks, according to the shift amount of the lens from the traverse axis; and
    controlling seeking so that the convergent point of the optical beam is moved from the first address to the second address using the corrected number of tracks to be sought.

9. The seek processing method according to claim 8, further comprising the step of comparing, with a predetermined number, the number of tracks that has been calculated in the step of calculating the number of tracks, wherein
    when the number of tracks to be sought is judged to be equal to or less than the predetermined number in the step of comparing, the convergent point of the optical beam is moved from the first address to the second address of the optical disc in the step of controlling seeking by using the number of tracks to be sought that has been calculated in the step of calculating the number of tracks, without performing the step of correcting the number of tracks to be sought.

* * * * *